United States Patent
Lee et al.

(10) Patent No.: US 11,329,338 B2
(45) Date of Patent: May 10, 2022

(54) RECHARGEABLE BATTERY

(71) Applicant: Samsung SDI Co., Ltd., Yongin-si (KR)

(72) Inventors: Jaewook Lee, Yongin-si (KR);
Kyongjin Kim, Yongin-si (KR);
Jinhwan Kim, Yongin-si (KR);
Junhyoung Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 459 days.

(21) Appl. No.: 16/321,622

(22) PCT Filed: Jul. 27, 2017

(86) PCT No.: PCT/KR2017/008124
§ 371 (c)(1),
(2) Date: Jan. 29, 2019

(87) PCT Pub. No.: WO2018/021856
PCT Pub. Date: Feb. 1, 2018

(65) Prior Publication Data
US 2021/0288365 A1    Sep. 16, 2021

(30) Foreign Application Priority Data

Jul. 29, 2016  (KR) .................. 10-2016-0097250
Jan. 19, 2017  (KR) .................. 10-2017-0009291

(51) Int. Cl.
*H01M 50/184*   (2021.01)
*H01M 50/186*   (2021.01)
*H01M 50/536*   (2021.01)

(52) U.S. Cl.
CPC ....... *H01M 50/184* (2021.01); *H01M 50/186* (2021.01); *H01M 50/536* (2021.01)

(58) Field of Classification Search
CPC ......... H01M 50/147–198; H01M 50/528–529; H01M 50/536
See application file for complete search history.

(56) References Cited

U.S. PATENT DOCUMENTS 5,576,117 A    11/1996    Morita et al.
6,521,373 B1    2/2003    Suzuki et al.
(Continued)

FOREIGN PATENT DOCUMENTS

CN    1137177 A    12/1996
CN    1286506 A    3/2001
(Continued)

OTHER PUBLICATIONS

Chinese Office action issued in corresponding application No. CN 201780058274.8, dated Jun. 18, 2021, 26 pages (English Translation).

(Continued)

*Primary Examiner* — Jonathan Crepeau
*Assistant Examiner* — Jacob Buchanan
(74) *Attorney, Agent, or Firm* — Lewis Roca Rothgerber Christie LLP (57) ABSTRACT

A rechargeable battery according to an exemplary embodiment of the present invention includes: an electrode assembly formed by spirally winding a first electrode, a separator, and a second electrode; and a pouch that forms a sealing portion by thermally bonding an outer edge of a first external material and an outer edge of a second external material that receive the electrode assembly to withdraw tabs respectively connected to the first electrode and the second electrode to the outside, wherein the electrode assembly includes first curved portions that are convex at opposite sides of a first planar portion in a spiral-wound cross-section, the pouch includes a second planar portion corresponding to the first (Continued)

planar portion, and second curved portions that are connected to the second planar portion corresponding to the first curved portions, and the sealing portion is disposed in spaces, each set by an extension plane set in an extension direction of the first planar portion, external surfaces of the second curved portions, protruding in the extension direction, and a cross plane that is set in a direction crossing the extension direction at the end of the extension direction of the second curved portion.

16 Claims, 10 Drawing Sheets

(56) References Cited

U.S. PATENT DOCUMENTS

| | | | |
|---|---|---|---|
| 7,285,334 B1* | 10/2007 | Yamashita | H01M 50/116 428/458 |
| 2005/0017678 A1 | 1/2005 | Hiratsuka et al. | |
| 2007/0009795 A1* | 1/2007 | Otohata | H01M 50/557 429/185 |
| 2009/0023058 A1* | 1/2009 | Kim | H01M 50/10 429/131 |
| 2010/0003594 A1 | 1/2010 | Hong et al. | |
| 2010/0167113 A1 | 7/2010 | Lee et al. | |
| 2010/0310930 A1* | 12/2010 | Park | H01M 50/116 429/185 |
| 2011/0244315 A1 | 10/2011 | Yoon | |
| 2012/0040235 A1 | 2/2012 | Cho et al. | |
| 2013/0288116 A1 | 10/2013 | Rassat et al. | |
| 2015/0303413 A1 | 10/2015 | Yun | |
| 2017/0279093 A1* | 9/2017 | Park | H01M 50/10 |
| 2019/0006636 A1* | 1/2019 | Oh | H01M 50/116 |

FOREIGN PATENT DOCUMENTS

| | | |
|---|---|---|
| CN | 1574415 A | 2/2005 |
| CN | 101771169 A | 7/2010 |
| CN | 102208673 A | 10/2011 |
| CN | 105047980 A | 11/2015 |
| CN | 205004361 U | 1/2016 |
| CN | 105322107 A | 2/2016 |
| CN | 205122651 U | 3/2016 |
| JP | 2011-210707 A | 10/2011 |
| JP | 2013-535791 A | 9/2013 |
| JP | 5600078 B2 | 10/2014 |
| KR | 10-2008-0087340 A | 10/2008 |
| KR | 10-2010-0003557 A | 1/2010 |
| KR | 10-1296949 B1 | 8/2013 |
| KR | 10-1310732 B1 | 9/2013 |
| KR | 10-2014-0033585 A | 3/2014 |
| KR | 10-2015-0089463 A | 8/2015 |
| KR | 10-2015-0119664 A | 10/2015 |

OTHER PUBLICATIONS

Korean Office action issued in corresponding application No. KR 10-2017-0009291, dated Apr. 29, 2021, 11 pages.
Chinese Search Report issued in corresponding Chinese Patent Application No. 201780058274.8, dated Nov. 3, 2021, 2 pages.

* cited by examiner

RECHARGEABLE BATTERY

CROSS-REFERENCE TO RELATED APPLICATION(S)

This application is a National Phase Patent Application of International Patent Application No. PCT/KR2017/008124, filed on Jul. 27, 2017, which claims priority of Korean Patent Application No. 10-2016-0097250, filed Jul. 29, 2016 and Korean Patent Application No. 10-2017-0009291, filed Jan. 19, 2017. The entire contents of all of which are incorporated herein by reference.

TECHNICAL FIELD

The present disclosure relates to a rechargeable battery of which a spiral-wound electrode assembly is embedded in a case.

BACKGROUND ART

A demand for a rechargeable battery as an energy source increases according to technical development of a mobile device. A rechargeable battery is a battery that repeatedly performs charging and discharging, different from a primary battery.

A rechargeable battery with small capacity is used in a small portable electronic device, such as a mobile phone, a notebook computer, and a camcorder, and a rechargeable battery with large capacity may be used as a motor driving power source for a hybrid vehicle and an electric vehicle.

For example, the rechargeable battery includes an electrode assembly that performs charging and discharging and is formed by spirally winding electrodes and a separator, a pouch receiving the electrode assembly, and an electrode tab withdrawing the electrode assembly to the outside the pouch.

Since the electrode assembly is spiral-wound to a cylindrical shape and then pressed, curved portions that correspond to a thickness of the electrode assembly are formed at opposite sides of the electrode assembly, and a plate shape having a thickness is formed between the opposite curved portions. The pouch receives the electrode assembly and forms a sealing portion along an outer edge of the electrode assembly.

Sealing portions of the pouch, provided at side surfaces corresponding to the curved portions of the electrode assembly, are folded and thus form external side surfaces of the rechargeable battery. The curved portions set a maximum width of the electrode assembly, and side surfaces of the pouch, corresponding to the curved portions, set a maximum width of the rechargeable battery.

Since the sealing portions provided at the side surfaces are folded and thus folded side surfaces are further formed at side surfaces of the rechargeable battery, the maximum width of the rechargeable battery is increased by as much as thicknesses of the opposite sealing portions. That is, the maximum width of the electrode assembly is reduced within an allowable maximum width range of the rechargeable battery. The reduction of the maximum width of the electrode assembly may result in reduction of battery capacity. That is, when the sealing portions are folded, space utilization may be deteriorated.

DISCLOSURE

Technical Problem

One aspect of the present invention has been made in an effort to provide a rechargeable battery that increases battery capacitor and space utilization by increasing a maximum width of an electrode assembly received in a pouch.

Technical Solution

A rechargeable battery according to an exemplary embodiment of the present invention includes: an electrode assembly formed by spirally winding a first electrode, a separator, and a second electrode; and a pouch that forms a sealing portion by thermally bonding an outer edge of a first external material and an outer edge of a second external material that receive the electrode assembly to withdraw tabs respectively connected to the first electrode and the second electrode to the outside, wherein the electrode assembly includes first curved portions that are convex at opposite sides of a first planar portion in a spiral-wound cross-section, the pouch includes a second planar portion corresponding to the first planar portion, and second curved portions that are connected to the second planar portion corresponding to the first curved portions, and the sealing portion is disposed in spaces, each set by an extension plane set in an extension direction of the first planar portion, external surfaces of the second curved portions, protruding in the extension direction, and a cross plane that is set in a direction crossing the extension direction at the end of the extension direction of the second curved portion.

A width of the sealing portion, set in the extension direction, may be greater than half of a sum thickness of the first planar portion and the second planar portion and less than the sum thickness.

The first external material may be closely attached to the first planar portion and the first curved portions of the electrode assembly, and the second external material may be closely attached to the first planar portion of the electrode assembly.

The sealing portion may include folding portions that are closely attached to external surfaces of the second curved portions, and the folding portions may be disposed in the spaces.

The folding portion may be alternately folded in opposite directions.

The folding portion may further include a pad member inserted into a folded side.

The folding portion may be continuously folded in the same direction.

The sealing portion may include: a front bonding portion provided at one side through which the tabs are withdrawn out and thermally bonding the first external material and the second external material; and side folding portions that are provided at the side curved portions between a rear connection portion that connects the first external material and the second external material and the front bonding portion.

The sealing portion may include: a front bonding portion and a rear bonding portion provided at opposite sides through which the tabs are withdrawn out and thermally bonding the first external material and the second external material; and side folding portions provided at the second curved portions between the front bonding portion and the rear bonding portion.

The side folding portions may be disposed in the spaces and closely attached to the external surfaces of the second curved portions.

The side folding portions may be folded a plurality of times and disposed in the spaces.

The side folding portion may be alternately folded in opposite directions in the space and folded to a shorter width moving away from the external surface of the second curved portion.

The side folding portion may further include a pad member inserted into a folded side.

The pad member may be formed of a wire and inserted to the entire length of the side folding portion.

The side folding portions may be folded in the same direction, and may be disposed in the spaces.

Advantageous Effects

According to the exemplary embodiment of the present invention, the sealing portion (e.g., the side folding portion) of the pouch is received in the space set by an extension plane set in an extension direction of the first planar portion, an external surface of the second curved portion, and a cross plane set in a direction that crosses the extension direction of the second curved portion, and thus a maximum width (set as a distance between the opposite second curved portions) of the electrode assembly received in the pouch can be increased. Accordingly, battery capacity of the rechargeable battery can be increased and space utilization can be increased.

MODE FOR INVENTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
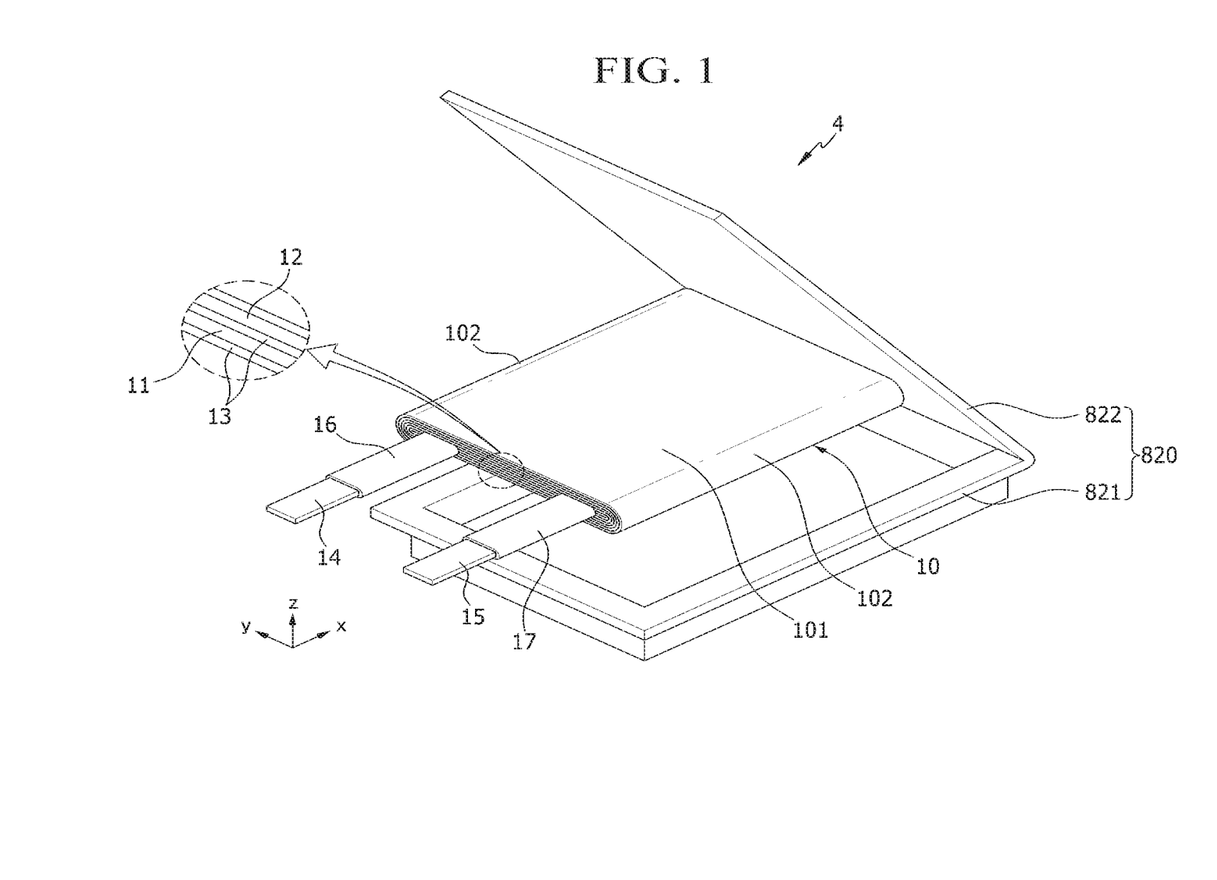
FIG. 1 is an exploded cross-sectional view of a rechargeable battery according to a first exemplary embodiment of the present invention.
Figure 2:
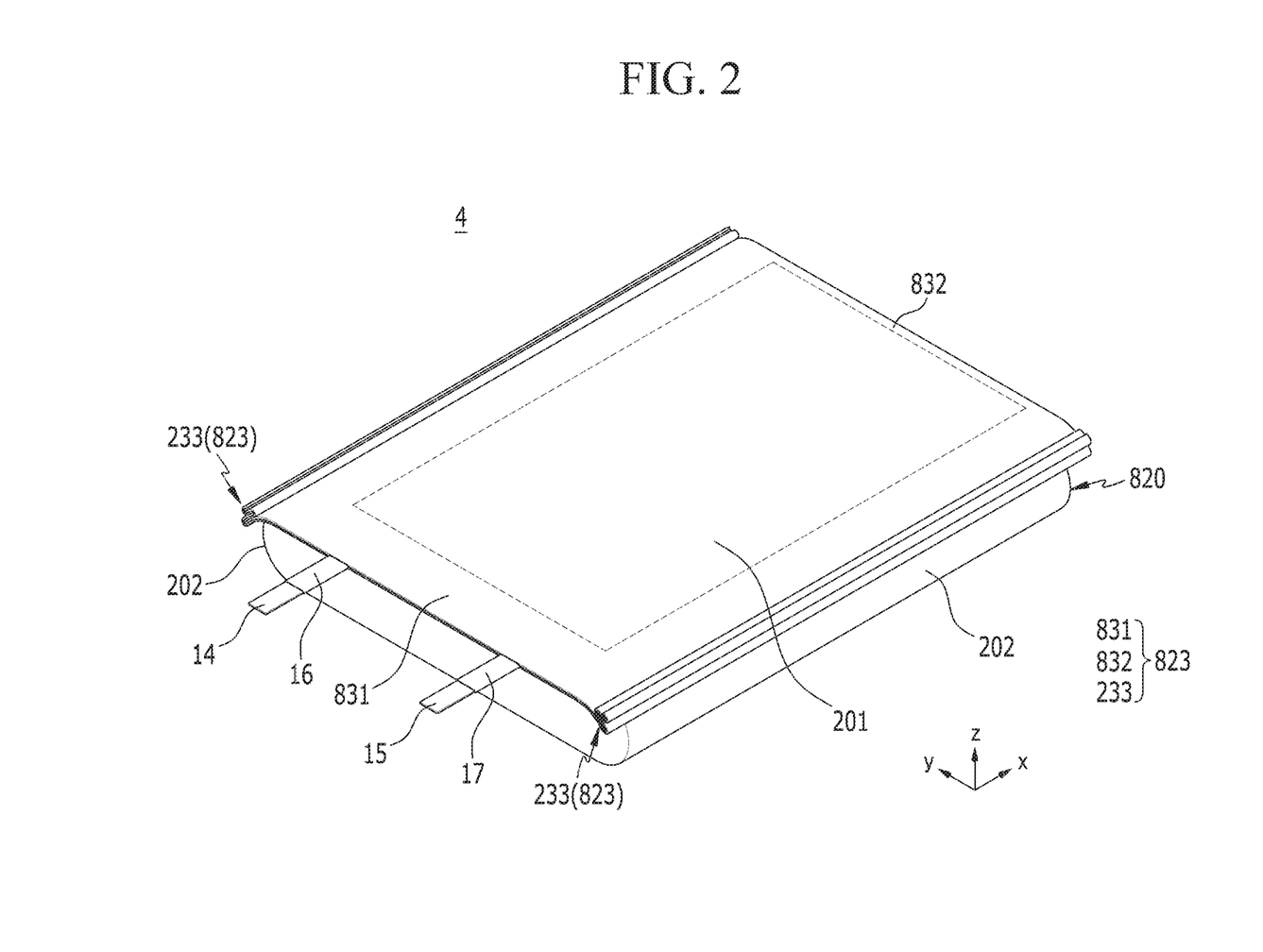
FIG. 2 is a perspective view of a sealing portion of the rechargeable battery of FIG. 1, which is in a folded state.

FIG. 1 is an exploded cross-sectional view of a rechargeable battery according to a first exemplary embodiment of the present invention, and FIG. 2 is a perspective view of a sealing portion of the rechargeable battery of FIG. 1, which is in a folded state.

Referring to FIG. 1 and FIG. 2, in a rechargeable battery 4 according to the first exemplary embodiment, a pouch 820 forms a sealing portion 823 by thermally bonding an outer edge of a first external material 821 and an outer edge of a second external material 822. The first and second external materials 821 and 822 are integrally connected by a rear connection portion 832. In the pouch 820, portions of the sealing portion 823 of the first and second external materials 821 and 823, disposed at opposite sides along the y-axis direction, are folded such that folded portions are formed.

In the pouch 820, the sealing portions 823 include a front bonding portion 831 provided at one side in the x-axis direction through which tabs 14 and 15 are withdrawn out, and folded portions 233 provided at second curved portions 202 between the front bonding portion 831 and the rear connection portion 832.

In the pouch 820 of the rechargeable battery 4 according to the first exemplary embodiment, since no additional sealing portion is formed at a rear side due to the integrally formed rear connection portion 832, a sealing process of the pouch 820 can be simplified and a length of an electrode assembly 10 can be extended in the x-axis direction.

A detailed configuration of the electrode assembly 10 and the pouch 820 are disclosed in a second exemplary embodiment which will be described later.

Figure 3:
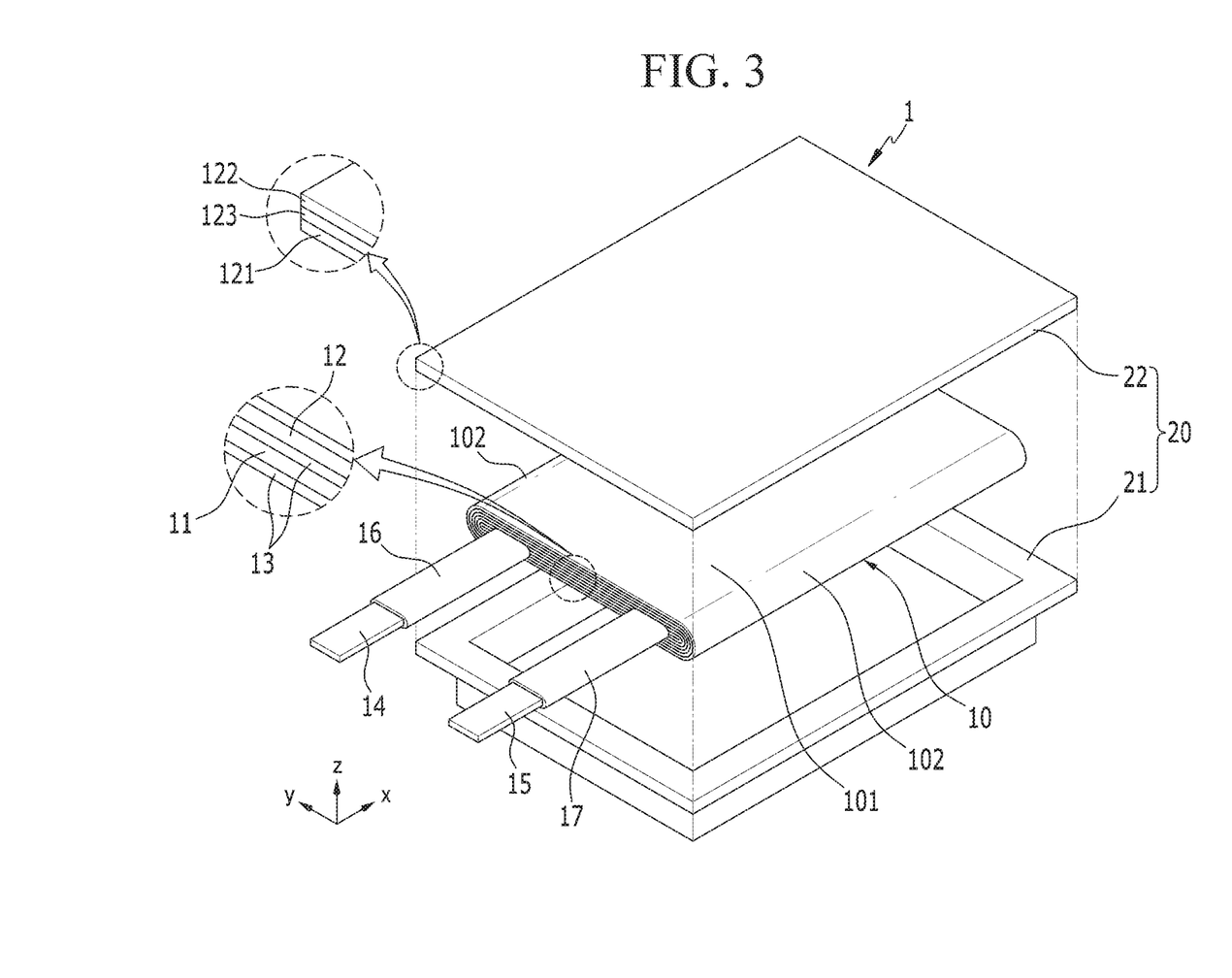
FIG. 3 is an exploded perspective view of a rechargeable battery according to a second exemplary embodiment of the present invention.
Figure 4:
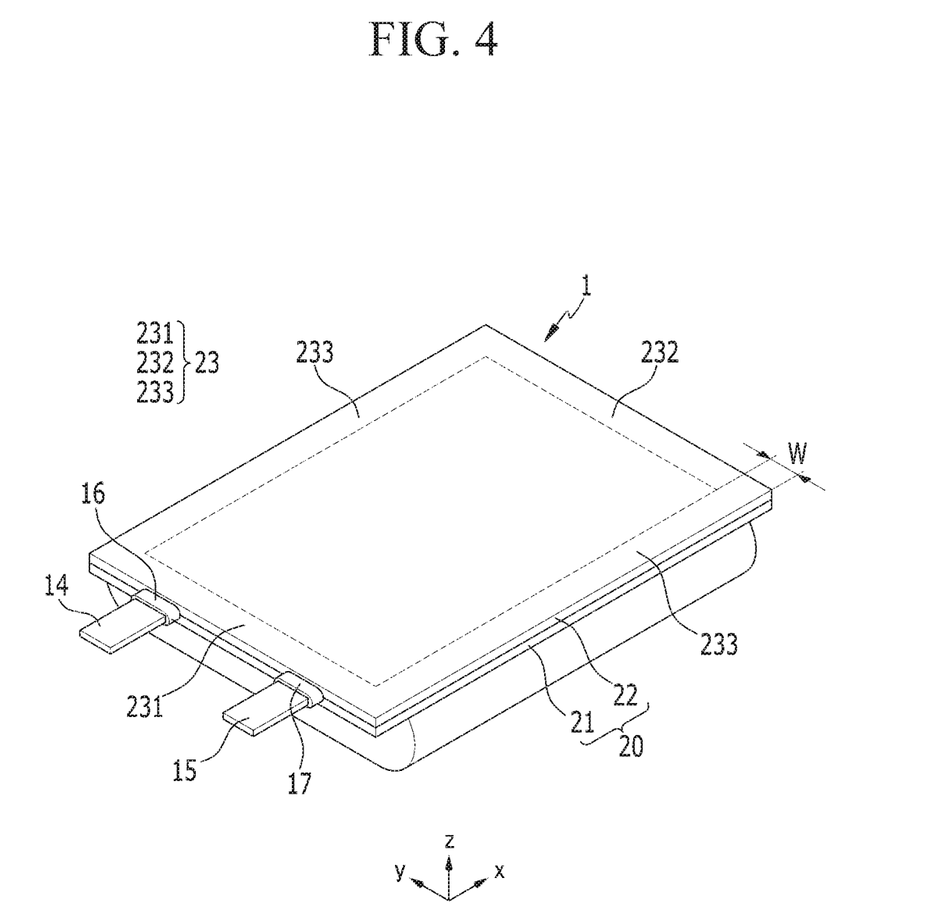
FIG. 4 is a perspective view of the rechargeable battery of FIG. 3, which is in an assembled state.

FIG. 3 is an exploded perspective view of a rechargeable battery according to a second exemplary embodiment of the present invention, and FIG. 4 is a perspective view of the rechargeable battery of FIG. 3 in an assembled state. Referring to FIG. 3 and FIG. 4, a rechargeable battery 1 includes an electrode assembly 10 that charges and discharges a current, and a pouch 20 that receives the electrode assembly 10 and an electrolyte.

The electrode assembly 10 is formed by disposing a first electrode (referred to as a positive electrode for convenience in description) 11 and a second electrode (referred to as a negative electrode for convenience in description) 12, disposing a separator 13 therebetween, and spirally winding the positive electrode 11, the separator 13, and the negative electrode 12, such that the electrode assembly 10 is formed in the shape of a jelly roll.

The electrode assembly 10 is formed flat by pressing side surfaces of the spirally wound cylindrical shape. The electrode assembly 10 may be withdrawn to the outside the pouch 20 through the tabs 14 and 15 that are connected with the positive electrode 11 and the negative electrode 12 and provided at one side of the spirally wound cross-section.

The positive electrode 11 includes a coated region in which a positive active material is coated to a current collector, which is provided as a metal thin plate, and an uncoated region which is provided as an exposed part of the current collector since a positive active material is not coated thereto. For example, the tab 14 connected to the current collector and the uncoated region of the positive electrode 11 may be formed of aluminum (Al).

The negative electrode 12 includes a coated region in which a negative active material that is different from the active material of the positive electrode 11 is coated to a current collector, which is provided as a metal thin plane, and an uncoated region provided as an exposed part of the current collector since no negative active material is coated thereto. For example, the tab 15 connected to the current collector, and the uncoated region may be formed of nickel (Ni).

The electrode assembly 10 includes a first planar portion 101 in the spirally wound cross-section (the y-z plane), and curved portions 102 that are disposed at opposite sides of the first planar portion 101. That is, the electrode assembly 10 forms the spirally wound cross-section (i.e., the y-z plane) at a rear side, which is opposite to a front side (i.e., the x-axis direction) through which the tab 15 is withdrawn out, forms the first planar portion 101 in the middle of the spirally wound cross-section, and forms the curved portions 102 that are convex to the outside in the opposite sides (i.e., the y-axis direction) of the first planar portion 101.

The pouch 20 is formed by thermally bonding an outer edge of a first external material 21 and an outer edge of a second external material 22 to each other, thereby forming a sealing portion 23. The tabs 14 and 15 electrically connect the inside and the outside of the pouch 20 through the sealing portion 23. Insulation members 16 and 17 electrically insulate the tabs 14 and 15 such that the tabs 14 and 15 and the pouch 20 are safely electrically insulated from each other.

Figure 5:
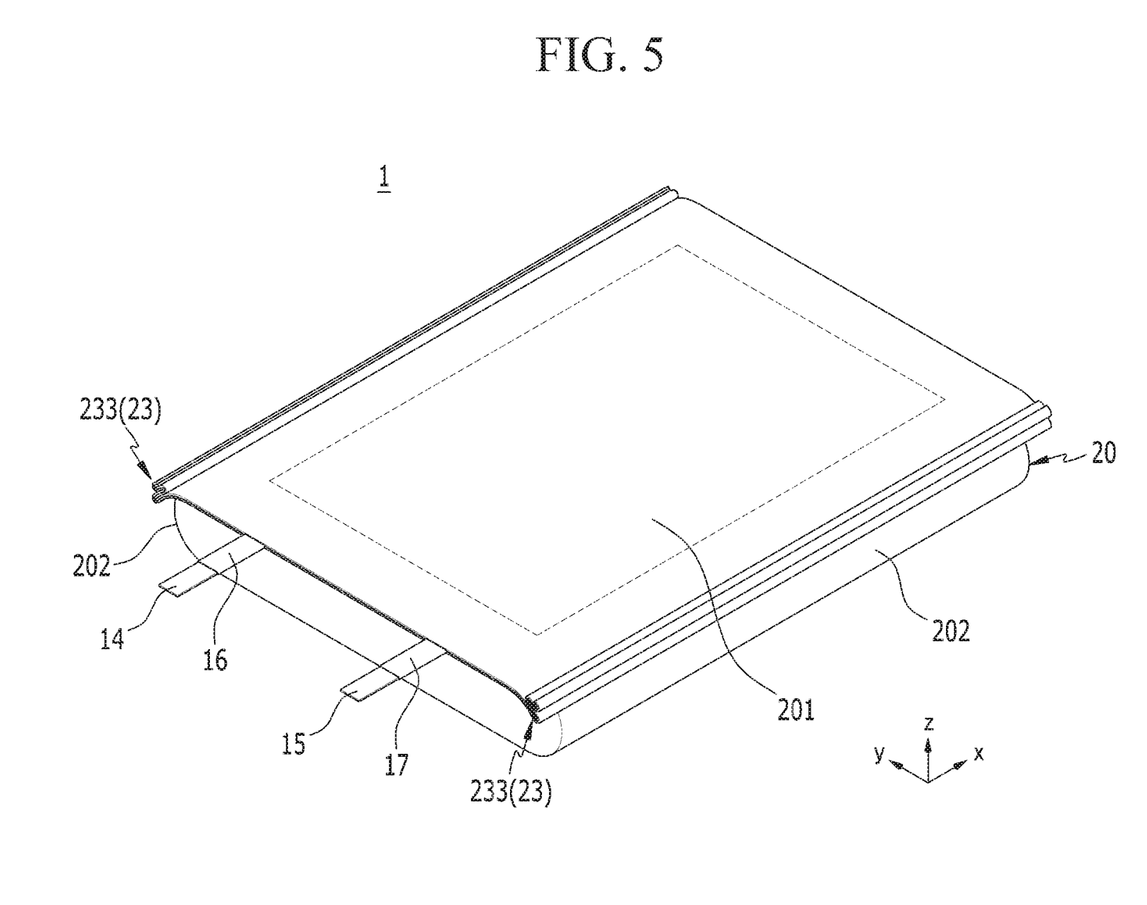
FIG. 5 is a perspective view of a sealing portion of the rechargeable battery of FIG. 4, which is in a folded state.
Figure 6:
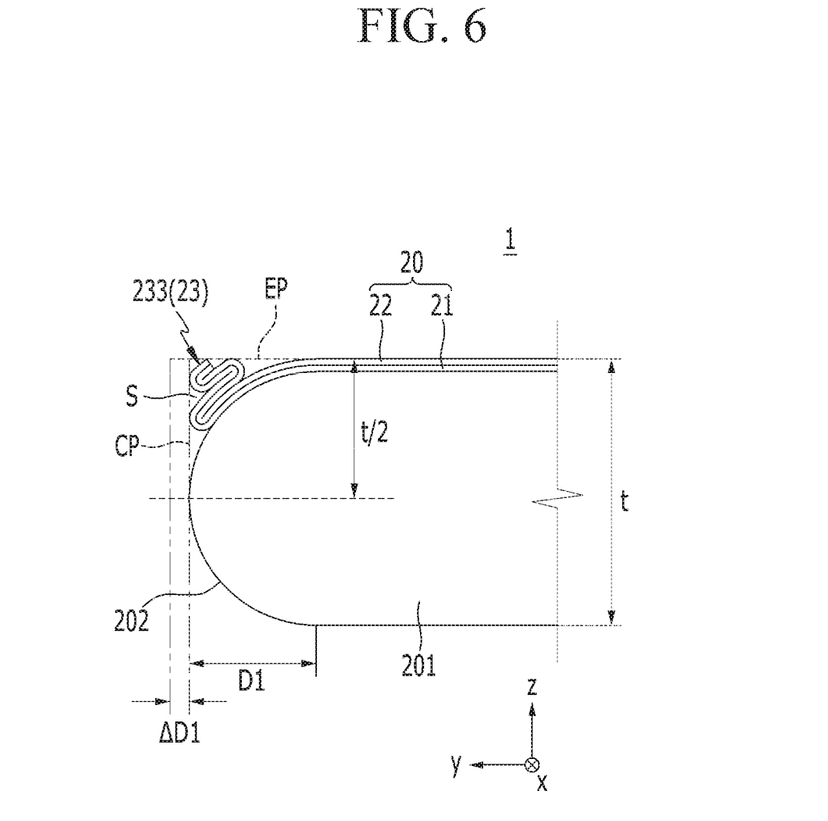
FIG. 6 is a front view of the rechargeable battery of FIG. 5, viewed from the front.

FIG. 5 is a perspective view of a sealing portion of the rechargeable battery of FIG. 4, which is in a folded state, and FIG. 6 is a front view of the rechargeable battery of FIG. 5, viewed from the front. Referring to FIG. 4, FIG. 5, and FIG. 6, the pouch 20 has a structure that corresponds to a structure of the electrode assembly 10 received in the pouch 20.

For example, the pouch 20 includes a second planar portion 201 that corresponds to the first planar portion 101, and second curved portions 202 that are connected to opposite sides (y-axis direction) of the second planar portion 201 and correspond to the first curved portions 102.

The sealing portion 23 of the pouch 20 is disposed in a space S set by a virtual extension plane EP set along an extension direction (the left and right sides in FIG. 6, i.e., the y-axis direction) of the first planar portion 101, external surfaces of the second curved portions 202, protruded toward the extension direction, and a virtual crossing plane CP set along a direction (the top and bottom of FIG. 6, i.e., the z-axis direction) that crosses the extension direction from an end of the extension direction of the second curved plane 202. The sealing portion 23 does not increase a width in the y-axis direction in the rechargeable battery 1.

In this case, the first external material 21 is closely attached to the first planar portion 101 and the first curved portions 102 of the electrode assembly 10, and the second external material 22 is closely attached to the first planar portion 101 of the electrode assembly 10. The first and second external materials 21 and 22 minimize an increase of the width in the y-axis direction and an increase of the thickness in the z-axis direction in the rechargeable battery 1.

A width W (refer to FIG. 4) of the sealing portion 23, set along the extension direction (i.e., y-axis direction), is greater than the half of the sum of thicknesses t (refer to FIG. 6) of the first planar portion 101 and the second planar portion 201 and is less than the sum thickness t (t/2<W≤t).

That is, the sealing portions 23 are disposed within a maximum protrusion range D1 of the second curved portions 202 disposed at opposite sides of the extension direction (the left and right direction in FIG. 6, i.e., the y-axis direction) of the first planar portion 101. That is, the sealing portions 23 of the pouch 20 are provided at outer sides of the second curved portions 202 within the maximum protrusion range D1 of the second curved portions 202 in the y-axis direction.

Thus, the sealing portion may not be disposed at the outermost side of each of the second curved portions 202 in the y-axis direction. In addition, a thickness and a space occupied by the sealing portions at the outermost sides of the second curved portions 202 in the y-axis direction may be removed. That is, the sealing portions 23 prevent an increase of the width in the y-axis direction in the rechargeable battery 1 while assuring a sealing force applied to the first and second external materials 21 and 22. Accordingly, capacity reduction of the rechargeable battery 1 can be prevented.

Referring back to FIG. 3, the pouch 20 may have a multi-layered sheet structure that surrounds the external side of the electrode assembly 10. For example, the pouch 20 includes a polymer sheet 121 that forms an interior surface and provides electrical insulation and thermal bonding functions, a nylon sheet 122 that protects the pouch 20 by forming an exterior surface, and a metal sheet 123 that provides mechanical strength.

The nylon sheet 122 may be replaced with a polyethylene terephthalate (PET) sheet or a PET-nylon composite sheet 122. The metal sheet 123 is disposed between the polymer sheet 121 and the nylon sheet 122, and may be formed of an aluminum sheet.

The pouch 20 receives the electrode assembly 10 with the first external material 21 and covers the electrode assembly 10 with the second external material 22, and the first external material 21 and the second external material 22 are thermally bonded to each other at an outer side of the electrode assembly 10 such that the sealing portion 23 is formed.

For example, the first external material 21 has a concave structure to receive the electrode assembly 10, and the second external material 22 has a flat structure to cover the electrode assembly 10 received in the first external material 21. The first and second external materials 21 and 22 may be formed of the polymer sheet 121, the nylon sheet 122, and the metal sheet 123, and they may have the same layer structure.

In the pouch 20, the sealing portion 23 includes folding portions 233 that are closely attached to the external surface of the second curved portion 202. The folding portions 233 are disposed in the space S. For example, the folding portions 233 may be alternately folded in opposite directions.

More specifically, in the pouch 20, the sealing portion 23 includes a front bonding portion 231 and a rear bonding portion 232 that are provided at opposite sides in the x-direction through which the tabs 14 and 15 are withdrawn out, and side folding portions 233 that are provided at the second curved portions 202 between the front bonding portion 231 and the rear bonding portion 232.

Referring to FIG. 5 and FIG. 6, each of side folding portions 233 is folded in the y-axis direction, extends in the x-axis direction, and thus is closely attached to the external surface of the second curved portion 202 within the maximum protrusion range D1 of the second curved portion 202 in the y-axis direction of the pouch 20.

That is, the side folding portions 233 are folded a plurality of times, and are disposed in spaces S, each set by an extension plane EP extending to the maximum protrusion range D1 in the y-axis direction of the second curved portion 202, an external surface of the second curved portion 202 protruding in the extension direction, and a virtual cross plane CP set in the z-axis direction at the end of the extension direction of the second curved portion 202, and then closely attached to the external surface of the second curved portion 202.

The virtual cross plane CP is set to a half thickness range t/2 of one side divided from the center of the sum thickness t of the first planar portion 101 and the second planar portion 201. For convenience in description, a thickness difference due to the first and second external materials 21 and 22 is ignored within the half thickness range t/2.

Thus, the side folding portions 233 increase the maximum width (i.e., the maximum protrusion range D1) of the electrode assembly 10 received in the pouch 20 and set in the y-direction such that battery capacity can be increased and space utilization of the rechargeable battery 1 can be increased.

That is, the side folding portion 233 can further increase a width of the electrode assembly 10, that is, the maximum protrusion range D1 between the second curved portions 202 or the second planar portion 201, by as much as a width difference ΔD1 (in the y-axis direction) of the electrode assembly reduced by a side folding portion according to a conventional art.

As the sum thickness t of the electrode assembly 10 and the pouch 20 set in the z-axis direction is increased, the space S formed at one side of the second planar portion 202 is increased. As the space S is increased while the maximum protrusion range D1 is fixed, an acceptable range of the side folding portion 233 is increased.

For example, the side folding portion 233 may be alternately folded in opposite directions in the space S of the second curved portion 202 and then received therein. The space S is narrowed moving away from the second curved portion 202. In this case, the side folding portion 233 is folded to a shorter width moving away from the external surface of the second curved portion 202. That is, the side folding portion 233 can be folded to the maximum corresponding to the shape of the space S and then received in the space S.

In addition, the side folding portion 233 is disposed within the maximum protrusion range D1 of the second curved portion 202 in the y-axis direction, and within the half thickness range t/2 of one side divided from the center of the sum thickness t of the first planar portion 101 and the second planar portion 201 in the z-axis direction.

Since the side folding portions 233 disposed in the second curved portions 202 in the spaces S do not exceed the maximum protrusion range D1 of the second curved portion 202 at opposite sides in the y-axis direction, battery capacity can be increased by increasing the maximum width (i.e., the maximum protrusion range D1) of the electrode assembly 10 received in the pouch 20, and accordingly space utilization of the rechargeable battery 1 can be increased.

In the first exemplary embodiment, the sealing portion 823 is formed in three sides, while in the second exemplary embodiment, the sealing portion 23 is formed in four sides in the pouch 20. Thus, in the first and second exemplary embodiments, the pouches 820 and 20 can be formed of various first external materials 821 and 21 and second external materials 822 and 22. In addition, in the rechargeable battery 4 of the first exemplary embodiment, the electrode assembly 10 may have a longer length in the x-axis direction, compared to the rechargeable battery 1 of the second exemplary embodiment.

Hereinafter, third and fourth exemplary embodiments of the present invention will be described. The configurations of the first to fourth embodiments are compared and different configurations will be described, and thus descriptions of the same configurations will be omitted.

Figure 7:
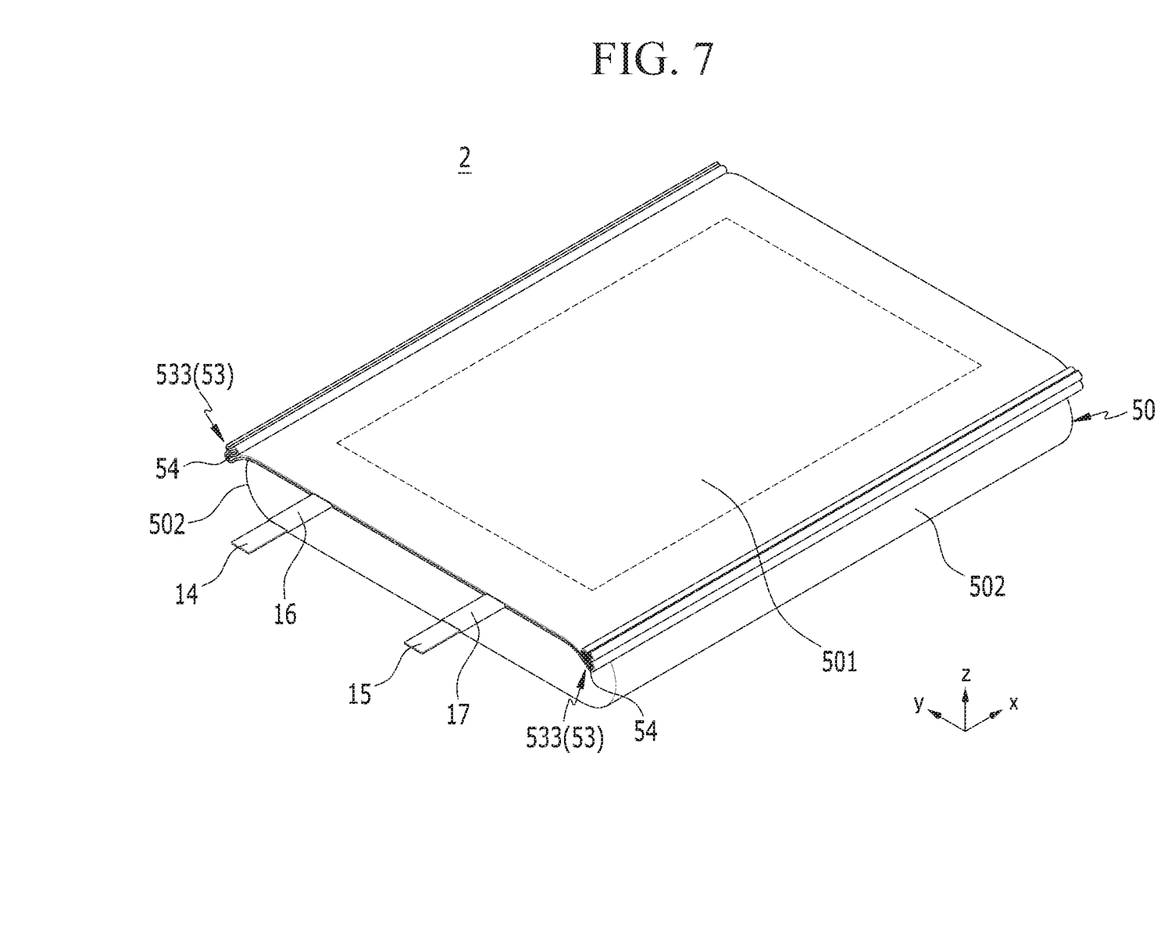
FIG. 7 is a perspective view of a sealing portion of a rechargeable battery according to a third exemplary embodiment of the present invention, which is a folded state.
Figure 8:
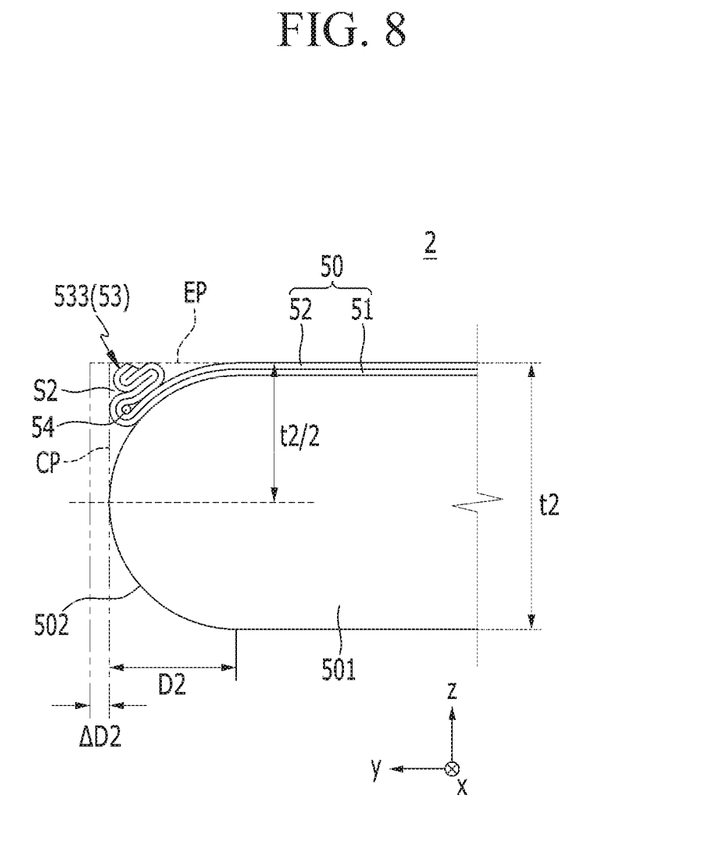
FIG. 8 is a partial front view of the rechargeable battery of FIG. 7, viewed from the front.

FIG. 7 is a perspective view of a folded state of sealing portions of a rechargeable battery according to a third exemplary embodiment of the present invention, and FIG. 8 is a partial front view of the rechargeable battery of FIG. 7, viewed from the front. Referring to FIG. 7 and FIG. 8, in a pouch 50 of a rechargeable battery 2 according to the third exemplary embodiment, portions of sealing portions 53 of first and second external materials 51 and 52, disposed at opposite sides in the y-axis direction, are folded and thus folding portions are formed. The folding portion may further include a pad member 54 inserted into the folded inside of the folding portion.

In the third exemplary embodiment, the pouch 50 is provided with side folding portions 533. The side folding portions 533 are disposed in a space S2 set by an extension plane EP of a second planar portion 501, an external surface of a second curved portion 502 protruding toward an extension direction (the let and right side in FIG. 8, i.e., the y-axis direction), and a virtual cross plane CP set in the z-axis direction at the end of the extension direction of the second curved portion 502, and are closely attached to the external surface of the second curved portion 502.

Thus, the side folding portions 533 are disposed within a maximum width of an electrode assembly 10 (i.e., a maximum protrusion range D2 of the second curved portions 502) that is received in the pouch 50 and set in the y-axis direction. That is, the side folding portion 533 is provided at one external side of each of the second curved portions 502 within the maximum protrusion range D2 of the second curved portion 502 in the y-axis direction.

Thus, the side folding portions may not be disposed at the outermost sides of the second curved portions 502 in the y-axis direction. That is, a thickness and a space occupied by the side folding portion at each of the outermost side surfaces of the second curved portions 502 in the y-axis direction are eliminated. In addition, capacity reduction of the rechargeable battery 2 can be prevented.

In the third exemplary embodiment, each side folding portion 533 includes a pad member 54 inserted into a folded portion of the side folding portion 533. The pad member 54 is formed of a wire and inserted in the entire length (x-axis direction) of the side folding portion 533. The pad member 54 can improve endurance strength of the sealing portion 53 and the side folding portion 533 with respect to external impact.

For example, the side folding portion 533 where the pad member 54 is embedded may be received in the space S2 of the second curved portion 520 by being alternately folded in opposite directions. The pad member 54 is disposed inside the primarily folded portion of the side folding portion 533, and thus may have a strong fastening force with the side folding portion 533.

The space S2 is narrowed moving away from the second curved portion 502. In this case, the side folding portion 533 is folded to a smaller width moving away from the external surface of the second curved portion 502. That is, the side folding portion 533 can be folded to the maximum corresponding to the shape of the space S and then received in the space S2.

In addition, the side folding portion 533 where the pad member 54 is embedded is disposed within the maximum protrusion range D2 of the second curved portion 502 in the y-axis direction, and within the half thickness range t/2 of one side divided from the center of the sum thickness t of the first planar portion 101 and the second planar portion 501 in the z-axis direction.

Since the side folding portions 533 disposed in the second curved portions 502 and having the pad members 54 embedded therein in the spaces S2 do not exceed the maximum protrusion range D2 of the second curved portion 502 at opposite sides in the y-axis direction, the maximum width (i.e., the maximum protrusion range D2) of the electrode assembly 10 received in the pouch 50 can be increased. Accordingly, battery capacity can be increased and space utilization of the rechargeable battery 2 can be increased.

That is, in the third exemplary embodiment, a width of the electrode assembly 10, that is, the maximum protrusion range D2 of the second curved portion 502 or a range of the second planar portion 501, can be further increased by as much as a width difference ΔD2 of the electrode assembly reduced by a conventional side folding portion.

Figure 9:
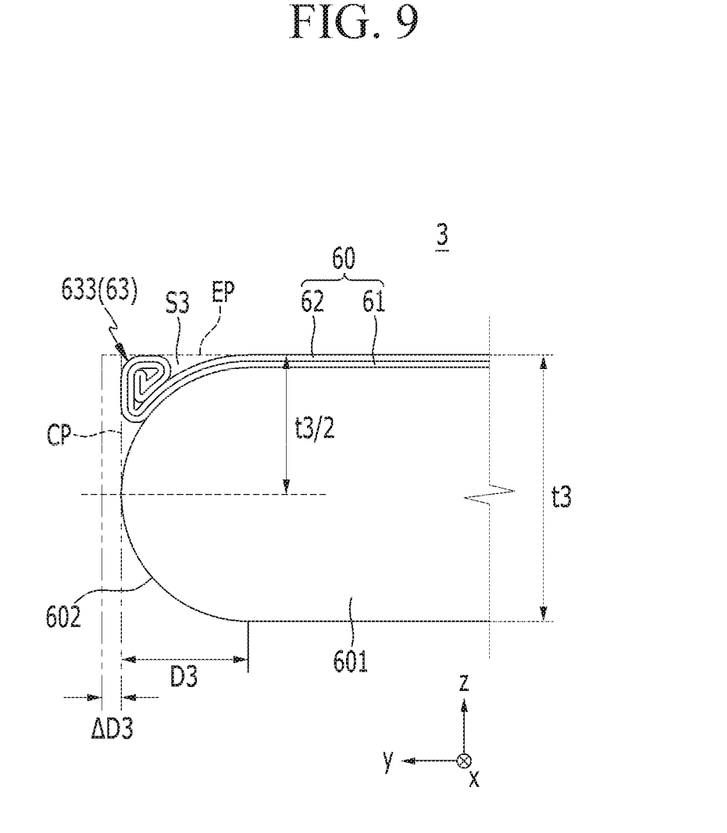
FIG. 9 is a partial front view of a rechargeable battery according to a fourth exemplary embodiment of the present invention, viewed from the front.

FIG. 9 is a partial front view of a rechargeable battery according to a fourth exemplary embodiment of the present invention, viewed from the front. Referring to FIG. 9, in a pouch 60 of a rechargeable battery 3 according to the fourth exemplary embodiment, first and second external materials 61 and 62 of a sealing portion 63, disposed at opposite sides in the y-axis direction, are folded (spirally wound) such that side folding portions 633 are formed.

The side folding portions 633 are folded in the same direction (clockwise direction in FIG. 9), and are disposed in spaces S3, each set by an extension plane EP extending to a maximum protrusion range D3 in the y-axis direction of a second curved portion 602, an external surface of a second curved portion 602 protruding in the extension direction, and a virtual cross plane CP set in the z-axis direction at the end of the extension direction of the second curved portion 602 and closely attached to the external surface of the second curved portion 602.

Thus, side folding portions may not be disposed at the outermost sides of the second curved portions 602 in the y-axis direction. That is, a thickness and a space occupied by the side folding portion at the outermost side of each of the second curved portions 602 in the y-axis direction are eliminated. In addition, capacity reduction of the rechargeable battery 3 can be prevented.

Figure 10:
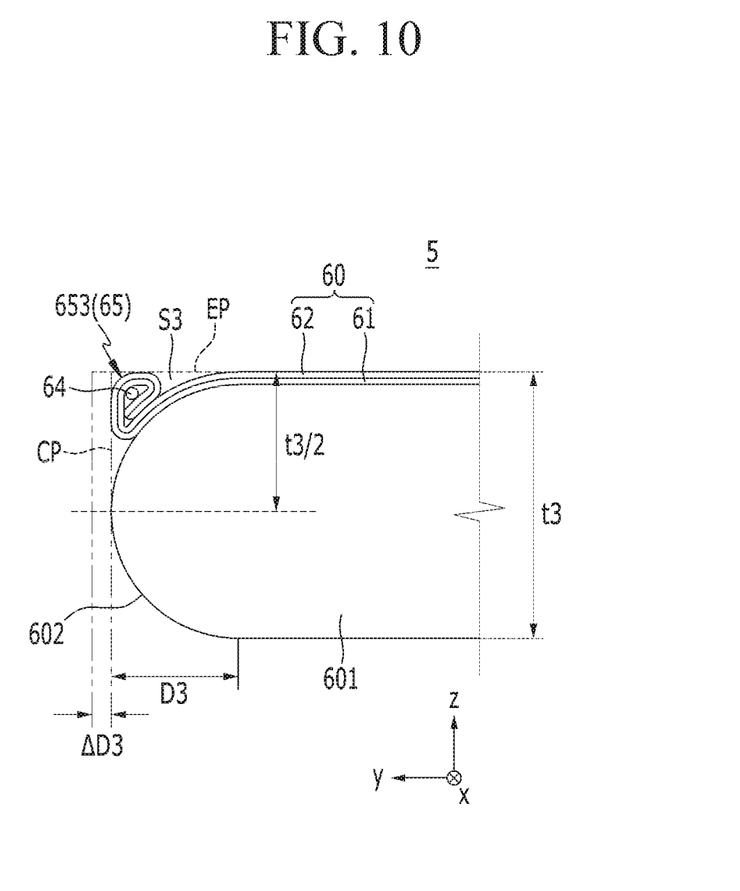
FIG. 10 is a partial front view of a rechargeable battery according to a fifth exemplary embodiment of the present invention, viewed from the front.

FIG. 10 is a partial front view of a rechargeable battery according to a fifth exemplary embodiment of the present invention, viewed from the front. Referring to FIG. 10, in a pouch 60 of a rechargeable battery 5 according to the fifth exemplary embodiment, side folding portions 653 further include pad members 64 inserted into inner sides of folded (spirally wound) portions.

Each pad member 64 is formed of a wire and inserted in the entire length (x-axis direction) of the side folding portion 653. The pad member 64 can improve endurance strength of a sealing portion 65 and the side folding portion 633 with respect to external impact.

Referring to the fourth and fifth exemplary embodiments together, the side folding portion 633 where the pad member 64 is not embedded and the side folding portion 653 where the pad member 64 is embedded may be continuously folded (spirally wound) in the same direction in the space S3 of the second curved portion 602 and then received therein. The pad member 64 is disposed in the innermost side of a portion where the side folding portion 653 is folded and thus may have a strong fastening force with the side folding portion 653.

The spaces S3 are formed at top and bottom sides in the second curved portion 602. That is, the side folding portions 633 and 653 each may be received by being folded to the maximum, corresponding to the shape of the space S3.

In addition, the side folding portion 633 where the pad member 64 is not embedded and the side folding portion 653 where the pad member 64 is embedded are disposed within the maximum protrusion range D3 of the second curved portion 602 in the y-axis direction and within a half thickness range t3/2 of one side divided from the center of a sum thickness t3 of a first planar portion 101 and a second planar portion 601 in the z-axis direction.

Since the side folding portions 633 and 653 that are closely attached to the second curved portion 602 do not exceed the maximum protrusion range D3 of the second curved portion 602 at opposite sides in the y-axis direction, the maximum width (i.e., the maximum protrusion range D3) of the electrode assembly 10 received in the pouch 60 can be increased. Accordingly, battery capacity can be increased and space utilization of the rechargeable batteries 3 and 5 can be increased.

That is, in the fourth and fifth exemplary embodiments, a width of the electrode assembly 10, that is, the maximum protrusion range D3 of the second curved portion 602 or a range of the second planar portion 601, can be more increased by as much as a width difference ΔD3 of the electrode assembly reduced by a conventional side folding portion.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS 1, 2, 3, 4, 5: rechargeable battery
10: electrode assembly
11, 12: first, second electrode (positive and negative electrodes)
13: separator
14, 15: tab
16, 17: insulation member
20, 50, 60, 820: pouch
21, 61, 821: first external material
22, 62, 822: second external material
23, 53, 63, 65, 823: sealing portion
54, 64: pad member
101: first planar portion
102: first curved portion
121: polymer sheet
122: nylon sheet
123: metal sheet
201, 501, 601: second planar portion
202, 502, 602: second curved portion
231, 831: front bonding portion
232: rear bonding portion
233, 533, 633, 653: side folding portion
832: rear connection portion
D1, D2, D3: maximum protrusion range between second curved portions
CP: cross plane EP: extension plane
S, S2, S3: space
t, t2, t3: sum thickness of first planar portion and second planar portion
W: width of sealing portion
ΔD1, ΔD2, ΔD3: width difference of electrode assembly, reduced by a conventional side folding portion

The invention claimed is:

1. A rechargeable battery comprising:
an electrode assembly formed by spirally winding a first electrode, a separator, and a second electrode; and
a pouch that forms a sealing portion by thermally bonding an outer edge of a first external material and an outer edge of a second external material that receive the electrode assembly to withdraw tabs respectively connected to the first electrode and the second electrode to the outside,
wherein the electrode assembly comprises first curved portions that are convex at opposite sides of a first planar portion in a spiral-wound cross-section,
the pouch comprises a second planar portion corresponding to the first planar portion, and second curved portions that are connected to the second planar portion and corresponds to the first curved portions,
the sealing portion is disposed in spaces, each set by
an extension plane set in an extension direction of the first planar portion, external surfaces of the second curved portions, protruding in the extension direction, and a cross plane that is set in a direction crossing the extension direction at the end of the extension direction of the second curved portion, and
the sealing portion is entirely arranged between the cross plane and the pouch.

2. The rechargeable battery of claim 1, wherein a width of the sealing portion, set in the extension direction, is greater than half of a sum thickness of the first planar portion and the second planar portion and less than the sum thickness.

3. The rechargeable battery of claim 1, wherein the first external material is closely attached to the first planar portion and the first curved portions of the electrode assembly, and
the second external material is closely attached to the first planar portion of the electrode assembly.

4. The rechargeable battery of claim 1, wherein the sealing portion comprises folding portions that are closely attached to external surfaces of the second curved portions, and
the folding portions are disposed in the spaces.

5. The rechargeable battery of claim 4, wherein the folding portion is alternately folded in opposite directions.

6. The rechargeable battery of claim 5, wherein the folding portion further comprises a pad member inserted into a folded side.

7. The rechargeable battery of claim 4, wherein the folding portion is continuously folded in the same direction.

8. The rechargeable battery of claim 1, wherein the sealing portion comprises:
a front bonding portion provided at one side through which the tabs are withdrawn out and thermally bonding the first external material and the second external material; and
side folding portions that are provided at the second curved portions between a rear connection portion that connects the first external material and the second external material and the front bonding portion.

9. The rechargeable battery of claim 1, wherein the sealing portion comprises:
a front bonding portion and a rear bonding portion provided at opposite sides through which the tabs are withdrawn out and thermally bonding the first external material and the second external material; and
side folding portions provided at the second curved portions between the front bonding portion and the rear bonding portion.

10. The rechargeable battery of claim 9, wherein the side folding portions are disposed in the spaces and closely attached to the external surfaces of the second curved portions.

11. The rechargeable battery of claim 10, wherein the side folding portions are folded a plurality of times and disposed in the spaces.

12. The rechargeable battery of claim 11, wherein the side folding portion is alternately folded in opposite directions in the space and folded to a shorter width moving away from the external surface of the second curved portion.

13. The rechargeable battery of claim 9, wherein the side folding portion further comprises a pad member inserted into a folded side.

14. The rechargeable battery of claim 13, wherein the pad member is formed of a wire and inserted to the entire length of the side folding portion.

15. The rechargeable battery of claim 10, wherein the side folding portions are folded in the same direction, and are disposed in the spaces.

16. The rechargeable battery of claim 1, wherein the sealing portion is entirely arranged between the cross plane, the extension plane, and the pouch.

* * * * *